United States Patent
Huber et al.

(10) Patent No.: US 9,511,665 B2
(45) Date of Patent: Dec. 6, 2016

(54) DRIVE TRAIN FOR A PTO SHAFT

(71) Applicant: CNH Industrial America LLC, New Holland, PA (US)

(72) Inventors: Roland Huber, Waldhausen (AT); Reinhard Koeck, Grein (AT); Josef Mayr, Ungenach (AT); Johann Monschein, Weistrach (AT); Christian Woerndl, Haid (AT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/782,076

(22) PCT Filed: Apr. 9, 2014

(86) PCT No.: PCT/EP2014/057186
§ 371 (c)(1),
(2) Date: Oct. 2, 2015

(87) PCT Pub. No.: WO2014/167016
PCT Pub. Date: Oct. 16, 2014

(65) Prior Publication Data
US 2016/0059695 A1    Mar. 3, 2016

(30) Foreign Application Priority Data
Apr. 10, 2013  (IT) .............................. MO2013A0091

(51) Int. Cl.
*B60K 17/28* (2006.01)
*F16D 67/02* (2006.01)
*F16D 13/52* (2006.01)
*F16D 63/00* (2006.01)

(52) U.S. Cl.
CPC ............... *B60K 17/28* (2013.01); *F16D 13/52* (2013.01); *F16D 63/002* (2013.01); *F16D 67/02* (2013.01)

(58) Field of Classification Search
CPC ....... B60K 17/28; F16D 67/02; F16D 67/04; F16D 67/06
See application file for complete search history.

(56) References Cited

U.S. PATENT DOCUMENTS 2,635,723 A * 4/1953 Feiertag ................. F16D 67/06
                                                     192/12 D
3,446,321 A * 5/1969 Nyman ................... F16D 67/02
                                                     192/18 B (Continued)

FOREIGN PATENT DOCUMENTS

EP          0262862       4/1988
JP          S62296764     12/1987

OTHER PUBLICATIONS

PCT International Search Report and Written Opinion mailed May 13, 2014.

*Primary Examiner* — Ruth Ilan
(74) *Attorney, Agent, or Firm* — Rickard K. DeMille

(57) ABSTRACT

A method and apparatus are disclosed for preventing rotation of a PTO shaft of a an agricultural vehicle when a clutch connecting the PTO shaft to a crankshaft of an engine of the vehicle is disengaged. A magnetic brake is used to apply to the PTO shaft means a retarding torque by means of a fixed magnet a retarding torque of a magnitude exceeding the maximum output torque of the clutch when the latter is disengaged.

7 Claims, 1 Drawing Sheet

(56) References Cited

U.S. PATENT DOCUMENTS

| | | | |
|---|---|---|---|
| 4,811,614 A * | 3/1989 | Lasoen | B60K 17/28 180/53.7 |
| 4,853,573 A * | 8/1989 | Wolcott | H02K 49/043 188/164 |
| 5,542,306 A | 8/1996 | Fernandez | |
| 7,159,701 B2 | 1/2007 | Graves | |
| 7,684,918 B2 | 3/2010 | Busch et al. | |
| 2005/0258012 A1 * | 11/2005 | Graves | F16D 59/02 192/15 |
| 2010/0050971 A1 * | 3/2010 | Park | F02N 11/00 123/179.25 |
| 2012/0132489 A1 * | 5/2012 | Adams | B60K 17/22 188/155 |

* cited by examiner

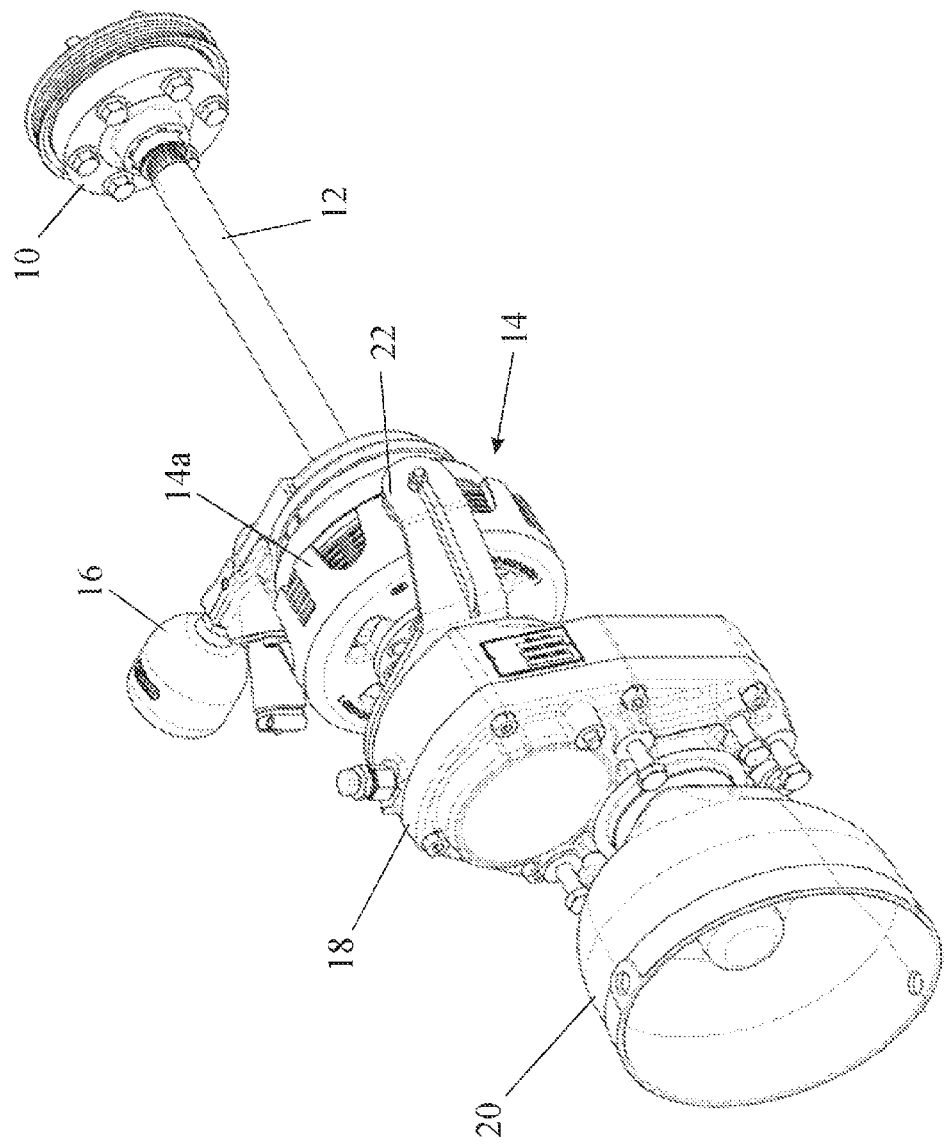

DRIVE TRAIN FOR A PTO SHAFT

CROSS REFERENCE TO RELATED APPLICATIONS

This application is a national stage of PCT Application No. PCT/EP2014/057186, entitled "DRIVE TRAIN FOR A PTO SHAFT", filed on Apr. 9, 2014, which claims priority from and the benefit of Italian Patent Application Serial No. MO2013A000091, filed on Apr. 10, 2013. Each of the foregoing applications is hereby incorporated by reference in its entirety.

FIELD OF THE INVENTION

The present invention relates to a drive train for a power take-off (PTO) shaft of an agricultural vehicle.

BACKGROUND OF THE INVENTION

Tractors commonly have splined PTO shafts to drive ancillary equipment, such as balers, that are connected the tractor. Such PTO shafts may be provided at the front and/or at the rear of the tractor. Different items of ancillary equipment may require one of two PTO shaft speeds and use couplings with different numbers of splines. To be able to drive all types of ancillary equipment, tractors may include a change speed gearbox to allow the appropriate PTO shaft speed to be selected and may have interchangeable splined coupling shafts.

In addition to the above components, a drive train connecting the PTO shaft to the engine crankshaft also includes a clutch to allow the PTO shaft to be disconnected from the engine. This clutch is disengaged when it is not required to drive the PTO shaft, while changing the speed of the gearbox, while changing the coupling shaft and while connecting ancillary equipment to the tractor.

For safety reasons, it is mandatory to bring the PTO shaft to a complete stop when the clutch is disengaged. As there is a possibility of some frictional drag on the plates of the drive plates of the clutch. it has previously been necessary to use friction brakes to prevent rotation of the PTO shaft when the clutch is disengaged. The entire layout of the drive train of the PTO shaft had therefore to be specially designed to accommodate such a friction brake and an actuation system was required to apply the brake at the same time as disengaging the clutch.

SUMMARY OF THE INVENTION

With a view to mitigating the foregoing disadvantages, there is provided in accordance with a first aspect of the invention a method of preventing rotation of a PTO shaft of an agricultural vehicle when a clutch connecting the PTO shaft to a crankshaft of an engine of the vehicle is disengaged, which method comprises applying to the PTO shaft by means of a fixed magnet a retarding torque of a magnitude exceeding the maximum output torque of the clutch when the latter is disengaged.

In some embodiments of the invention, the magnetic retarding torque is applied by means of one or more stationary magnets and an armature rotatable with the PTO shaft having circumferentially spaced pole pieces of ferromagnetic material.

In accordance with a second aspect of the invention, there is provided a drive train for a PTO shaft of an agricultural vehicle, comprising a friction clutch having an input side connectible to a crankshaft of an engine of the vehicle and an output side connectible to a PTO coupling shaft, characterised in that a magnetic brake is provided to apply a retarding torque to the output side of the clutch, the retardation torque of the magnetic brake exceeding the maximum torque transmittable through the clutch when the latter is disengaged.

The magnetic brake may suitably comprise one or more stationary magnets and an armature rotatable with the PTO shaft having circumferentially spaced pole pieces of ferromagnetic material.

Preferably, the stationary magnets are permanent magnets.

The clutch of the drive train may advantageously comprise two sets of interleaved plates that are pressed together and frictionally coupled to one another when the clutch is engaged and separated from one another when the clutch is disengaged, the first set of plates being mounted on a splined shaft for rotation with the engine and the second set of plates have radial projections that engage in axially extending slots in a cylindrical carrier.

When using a clutch having such a construction, the cylindrical carrier of the second set of plates may be made of a ferromagnetic material, allowing it to serve as the armature of the magnetic brake.

BRIEF DESCRIPTION OF THE DRAWINGS

The invention will now be described further, by way of example, with reference to the accompanying drawing, which is a perspective view of a drive train embodying the invention.

DETAILED DESCRIPTION OF THE ILLUSTRATED EMBODIMENT

The illustrated PTO shaft drive train comprises a flange 10 to be bolted for rotation with the crankshaft of the engine of a tractor or other agricultural vehicle The illustrated drive is intended for a front PTO shaft but the improvement of the invention is equally applicable to a rear PTO shaft.

The flange 10 is connected by a shaft 12 to the input side of a multi-plate dry friction clutch 14 having a clutch actuator 16. The clutch 16 comprises two sets of interleaved plates. A first set is connected, for example by internal splines or teeth, for rotation with the shaft 12. The plates of the second set can rotate relative to the input shaft 12 and have radially projections that engage in axially extending slots of a plate carrier 14.

The carrier 14a, which constitutes the output side of the clutch 14 is connected to the input side of a two-speed gearbox 18 the output of which drives the interchangeable the PTO coupling shaft mounted with a PTO connector 20.

As so far described, the drive train is conventional and for this reason need not be described in greater detail within the present context. A problem is encountered in such a drive train on account of the fact that some torque may be applied to the output side of the clutch 14 even when it is disengaged on account of frictional drag between the interleaved plates, such drag increasing with the speed of rotation of the shaft 12. This would result in the PTO shaft being rotated and could present a danger to an operator attempting to change the coupling shaft or to connect the PTO to ancillary equipment.

To prevent any such rotation of the PTO shaft when the clutch is disengaged, a powerful rare earth magnet is mounted by means of a fixed bracket 22 immediately adjacent the plate carrier 14*a* of the clutch. In the illustrated embodiment of the invention, the bracket is mounted on the gearbox 18 but it may alternatively be secured directly or indirectly to the chassis of the tractor. The axially extending slots in the carrier 14 define circumferentially spaced segments. These segments act as pole pieces of an armature rotatable with the PTO shaft and are attracted by the magnet 22. When the clutch is disengaged, the plate carrier 14*a* will come to rest with one of these segments opposite the magnet 22 and the attraction between them will apply a retarding torque to the carrier 14*a* that exceeds any torque applied to it by frictional drag between the two sets of plates.

The invention is predicated on the realisation that any torque that may be applied to the PTO shaft when the clutch is disengaged is small in comparison with the output torque of the PTO shaft when the clutch is engaged. Applying such a small braking force, even constantly, to the output shaft will not therefore have any noticeable effect on the operation of the PTO shaft when the clutch is engaged. It is in this way possible to dispense with a mechanism for applying and releasing the magnetic brake and it may remain permanently in the same position.

By using a magnetic brake, the invention avoids using friction components that are themselves prone to ware.

The attraction between the stationary magnet 22 (of which there may be more than one if necessary) and the pole pieces of the armature constituted by the plate carrier 14*a* of the clutch will result in the armature experiencing a fluctuating torque during rotation of the PTO shaft. The torque will be a retarding torque when a magnet is aligned with a pole piece and an accelerating torque when the magnet is aligned with the gap between two pole pieces. When the clutch is engaged, this will superimpose an imperceptible fluctuation on the output torque of the PTO shaft.

When, on the other hand, the clutch is disengaged the PTO shaft will come to rest with the or each magnet aligned with a pole piece and will be braked by the attraction between the pole piece and the stationary magnet(s).

It would be possible, though not currently preferred, to replace any permanent magnet by an electromagnet. This can be energised only at times that the clutch actuator 16 is operated to disengage the clutch 14. In this case, the electromagnet would not superimpose any torque on the PTO shaft when it is being driven by the engine.

It will be appreciated that various further modifications may be made to the described preferred embodiment without departing from the scope of the invention as set forth in the appended claims. The armature of the magnetic brake need not the formed by the clutch carrier and, for example if a wet clutch is used in place of the illustrated dry clutch, then a separate armature may be secured for rotation with the PTO shaft.

Furthermore, while the disclosed embodiment uses a stationary magnet and a rotating armature with spaced pole pieces, one or more magnets may be mounted for rotation with the PTO shaft to interact with stationary pole pieces, or further magnets fixed mounted around the rotating magnet(s) on the chassis of the tractor.

The invention claimed is:

1. A method of preventing rotation of a power take-off (PTO) shaft of an agricultural vehicle when a clutch connecting the PTO shaft to a crankshaft of an engine of the agricultural vehicle is disengaged, comprising:
    applying to the PTO shaft a retarding torque of a magnitude exceeding a maximum output torque of the clutch when the clutch is disengaged, wherein the retarding torque is applied by one or more stationary magnets and an armature rotatable with the PTO shaft having circumferentially spaced pole pieces of ferromagnetic material.

2. The method of claim 1, wherein the armature is constituted by a plate carrier of a dry multi-plate friction clutch.

3. A drive train for a power take-off (PTO) shaft of an agricultural vehicle, comprising:
    a friction clutch having an input side connectible to a crankshaft of an engine of the agricultural vehicle and an output side connectible to a PTO coupling shaft, wherein a magnetic brake is provided to apply a retarding torque to the output side of the friction clutch, the retarding torque of the magnetic brake exceeding a maximum torque transmittable through the friction clutch when the friction clutch is disengaged, and the magnetic brake comprises one or more stationary magnets and an armature rotatable with the PTO shaft having circumferentially spaced pole pieces of ferromagnetic material.

4. The drive train of claim 3, wherein the one or more stationary magnets comprise permanent magnets.

5. The drive train of claim 3, wherein the friction clutch comprises two sets of interleaved plates that are pressed together and frictionally coupled to one another when the friction clutch is engaged and separated from one another when the friction clutch is disengaged, a first set of plates of the two sets of interleaved plates are mounted on a splined shaft and configured to rotate with the engine, and a second set of plates of the two sets of interleaved plates have radial projections that engage in axially extending slots in a cylindrical carrier.

6. The drive train claim 5, wherein the cylindrical carrier is formed from a ferromagnetic material and serves as the armature of the magnetic brake.

7. The drive train of claim 3, wherein the PTO shaft is a front PTO shaft, mounted on a front end of the agricultural vehicle.

* * * * *